(12) United States Patent
Kisser et al.

(10) Patent No.: US 10,266,346 B1
(45) Date of Patent: *Apr. 23, 2019

(54) AUTOMATED FULFILLMENT OF UNMANNED AERIAL VEHICLES

(71) Applicant: Amazon Technologies, Inc., Seattle, WA (US)

(72) Inventors: Lauren Marie Kisser, Cambridge (GB); Armando Medina Romero, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,783

(22) Filed: Oct. 5, 2017

Related U.S. Application Data

(63) Continuation of application No. 15/269,477, filed on Sep. 19, 2016, now Pat. No. 9,815,633.

(51) Int. Cl.
| | |
|---|---|
| *B65G 37/02* | (2006.01) |
| *B64C 39/02* | (2006.01) |
| *G06Q 10/08* | (2012.01) |
| *G01R 31/00* | (2006.01) |
| *G01M 17/00* | (2006.01) |
| *B25J 9/00* | (2006.01) |
| *B64F 5/60* | (2017.01) |
| *B60L 11/18* | (2006.01) |
| *B64F 1/32* | (2006.01) |

(52) U.S. Cl.
CPC ............ *B65G 37/02* (2013.01); *B25J 9/0093* (2013.01); *B60L 11/1822* (2013.01); *B64C 39/024* (2013.01); *B64F 1/32* (2013.01); *B64F 5/60* (2017.01); *G01M 17/00* (2013.01); *G01R 31/008* (2013.01); *G06Q 10/0832* (2013.01); *B64C 2201/042* (2013.01); *B64C 2201/128* (2013.01)

(58) Field of Classification Search
CPC . B65G 37/02; B64C 2201/042; B64C 39/024; B64F 1/32
See application file for complete search history.

(56) References Cited

U.S. PATENT DOCUMENTS

| | | | | |
|---|---|---|---|---|
| 9,284,062 | B2 * | 3/2016 | Wang | B60L 11/1809 |
| 9,387,928 | B1 * | 7/2016 | Gentry | B64C 39/024 |
| 9,481,458 | B2 * | 11/2016 | Casado Magana | B64F 1/04 |
| 9,536,216 | B1 * | 1/2017 | Lisso | G06Q 10/0832 |
| 9,540,121 | B2 * | 1/2017 | Byers | B64C 39/024 |
| 9,815,633 | B1 * | 11/2017 | Kisser | B64C 39/024 |

(Continued)

OTHER PUBLICATIONS

U.S. Appl. No. 15/269,477 , "Notice of Allowance", dated Jul. 26, 2017, 9 pages.

*Primary Examiner* — Thomas Randazzo
(74) *Attorney, Agent, or Firm* — Kilpatrick Townsend & Stockton LLP

(57) ABSTRACT

A method and system for evaluating and loading vehicles (e.g., aerial vehicles and other vehicles) are described herein. The vehicles are moved by a conveyance device. It may be determined whether a vehicle passes at least one of a structural integrity test or a functionality test. The vehicle may be removed from the conveyance device, e.g., by a robotic manipulator, in the event the vehicle fails at least one of the structural integrity test or the functionality test.

20 Claims, 11 Drawing Sheets

(56) References Cited

U.S. PATENT DOCUMENTS

| | | | |
|---|---|---|---|
| 2013/0332008 A1* | 12/2013 | Herman | B64C 39/024 |
| | | | 701/2 |
| 2016/0200438 A1* | 7/2016 | Bokeno | B64C 39/024 |
| | | | 244/2 |
| 2016/0209839 A1* | 7/2016 | Hoareau | G05D 1/0027 |
| 2016/0257423 A1* | 9/2016 | Martin | B64F 1/00 |
| 2016/0376031 A1* | 12/2016 | Michalski | B64F 1/36 |
| | | | 701/15 |
| 2017/0011333 A1* | 1/2017 | Greiner | G06Q 10/083 |
| 2017/0175413 A1* | 6/2017 | Curlander | E04H 14/00 |
| 2017/0190423 A1* | 7/2017 | Salgueiro | B64C 39/024 |

* cited by examiner

US 10,266,346 B1

AUTOMATED FULFILLMENT OF UNMANNED AERIAL VEHICLES

CROSS REFERENCE TO RELATED APPLICATIONS

This application is a continuation of U.S. application Ser. No. 15/269,477, filed Sep. 19, 2016, and titled "AUTOMATED FULFILLMENT OF UNMANNED AERIAL VEHICLES", the contents of which are herein incorporated in its entirety.

BACKGROUND

The availability of unmanned aerial vehicles (UAVs) has increased in recent years. Along with this increased availability, has come an increased number of uses for UAVs. For example, a recreational UAV may be used to capture aerial photography of sporting events, land parcels, and remote areas. A commercial UAV, for example, may be used to transport payloads between locations.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present description are directed to, among other things, systems and techniques relating to evaluating and loading UAVs. In particular, the examples described herein relate to UAVs that transport packages between various locations. For example, the UAVs may be configured to collect packages from a warehouse and deliver the packages to receiving customers. The systems and techniques described herein ensure the UAVs are fit for additional deliveries and load the UAVs with new packages. The fitness evaluations and loading of packages can be performed in an automated manner, with little or no human involvement. Doing so may provide significant reductions in turnaround time (e.g., arrival to next departure) for UAVs resulting in higher utilization of UAVs.

Turning now to a particular example, in this example, a UAV delivers a package to a customer and returns to a home base (e.g., a warehouse facility). The UAV enters the facility and lands on a master conveyor. The master conveyor moves the UAV from evaluation station to evaluation station where different tests are performed on the UAV. The evaluation stations can test the structural integrity of the UAV, replace batteries, and test the power system of the UAV. The evaluation stations can also test systems relating to navigation, communication, avionics, propulsion, package delivery, and other systems. At any of the evaluation stations, if the UAV fails a test, the UAV can be removed from the master conveyor by a robotic arm and sent to an area of the facility dedicated to repairs. After passing the tests, the UAV is moved to a package loading station. At the package loading station, the UAV is automatically loaded with a new package and given instructions for executing delivery of the new package.

Figure 1:
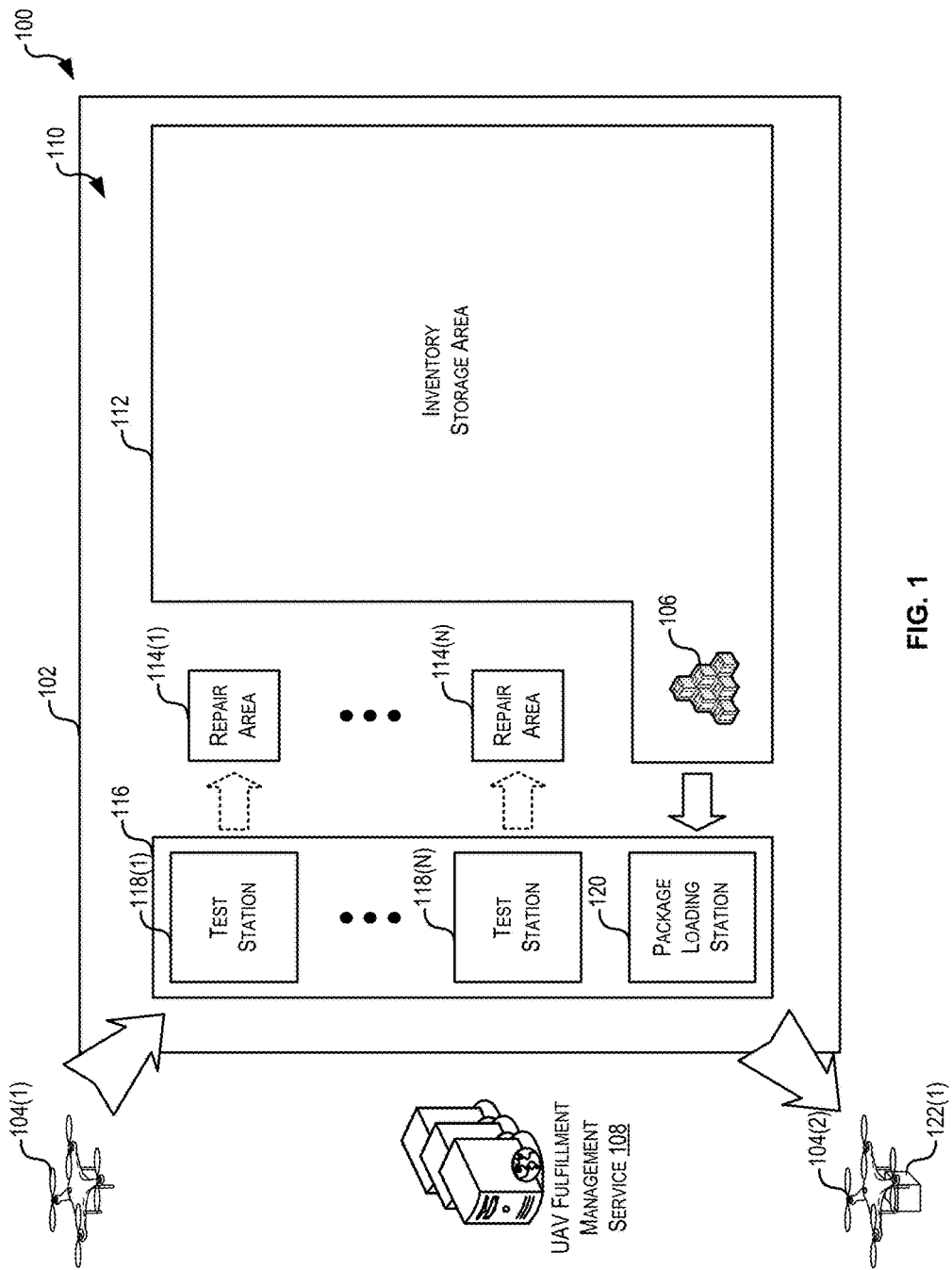
FIG. 1 is an example environment for implementing systems and techniques relating to evaluating and loading UAVs, according to at least one example.

Turning now to the figures, FIG. 1 illustrates an example environment 100 for implementing systems and techniques relating to evaluating and loading UAVs, according to at least one example. The environment 100 includes a facility 102 at which UAVs 104 may be evaluated and loaded with items 106 within packages 122. The environment 100 also includes a UAV fulfillment management service 108. The UAV fulfillment management service 108 may manage the operation of the UAVs 104 and certain automated devices within the facility 102 by communicating with the UAVs 104 and the automated devices via one or more networks (e.g., radio, cable, cellular, etc.).

The facility 102 includes an inventory management system 110. The inventory management system 110 may include any suitable combination of structures, systems, and the like for managing inventory items within the facility 102. The floor space of the facility 102 may be arranged to enable efficient execution of inventory processing by the inventory management system 110. For example, the facility 102 includes an inventory storage area 112, repair areas 114, and a UAV fulfillment area 116.

The UAV fulfillment area 116 includes one or more test stations 118(1)-118(N) and a package loading station 120. As described in detail herein, the UAVs 104 (e.g., the UAV 104(1)) may enter the facility 102 without a package 122. Upon entering the facility 102, the UAV 104(1) may be directed to land in the UAV fulfillment area 116. The UAV 104(1) may then be moved between the various test stations 118 where tests can be performed on the UAV 104(1). If during this time, the UAV 104(1) fails a test or it is determined that the UAV 104(1) has otherwise has been comprised, the UAV 104(1) may be transferred to one of the repair areas 114. In some examples, each of the repair areas 114 may be dedicated to performing repairs of a certain type. For example, if the UAV 104(1) fails a structural integrity test at one of the test stations 118(1) where this test is performed, the UAV 104(1) may be transferred to a repair area 114 where structural repairs can be performed and/or where UAVs 104 with similar problems can be accumulated.

If the UAV 104(1) passes each of the tests performed at the various test stations 118, then at the package loading station 120, a package 122 may be loaded into a package compartment of the UAV 104(1). For example, the package loading station 120 may include a packaging device configured to package the items 106 and to load the packaged items 106 (e.g., the packages 122) into the UAVs 104. The UAV 104(2) is illustrated after the package 122(1) has been loaded at the package loading station 120. As part of this process, delivery instructions for the loaded package 122(1) have also been provided to the UAV 104(2). The UAV 104(2) may use the delivery instructions for executing delivery of the package 122(1) to a recipient (e.g., a customer).

The inventory storage area 112 is configured for storing the items 106 in any suitable schema and using any suitable storage technology. For example, the items 106 in the inventory storage area 112 may be stored according to a sortable schema, a non-sortable schema, elements of a hub-and-spoke schema, item-specific schema, and any other suitable schema. The items 106 may be stored using any suitable technology such as portable shelving units having multiple compartments for holding the items 106. These portable shelving units may be picked up and transported by automated mobile drive units that move throughout the facility autonomously or semi-autonomously. The inventory management system 110 may also be implemented in traditional storage facilities in which the items 106 are stored in stationary shelves. In any event, the inventory management system 110 may be configured to move the items 106 to an area of the inventory storage area 112 adjacent to the UAV fulfillment area 116.

Figure 2:
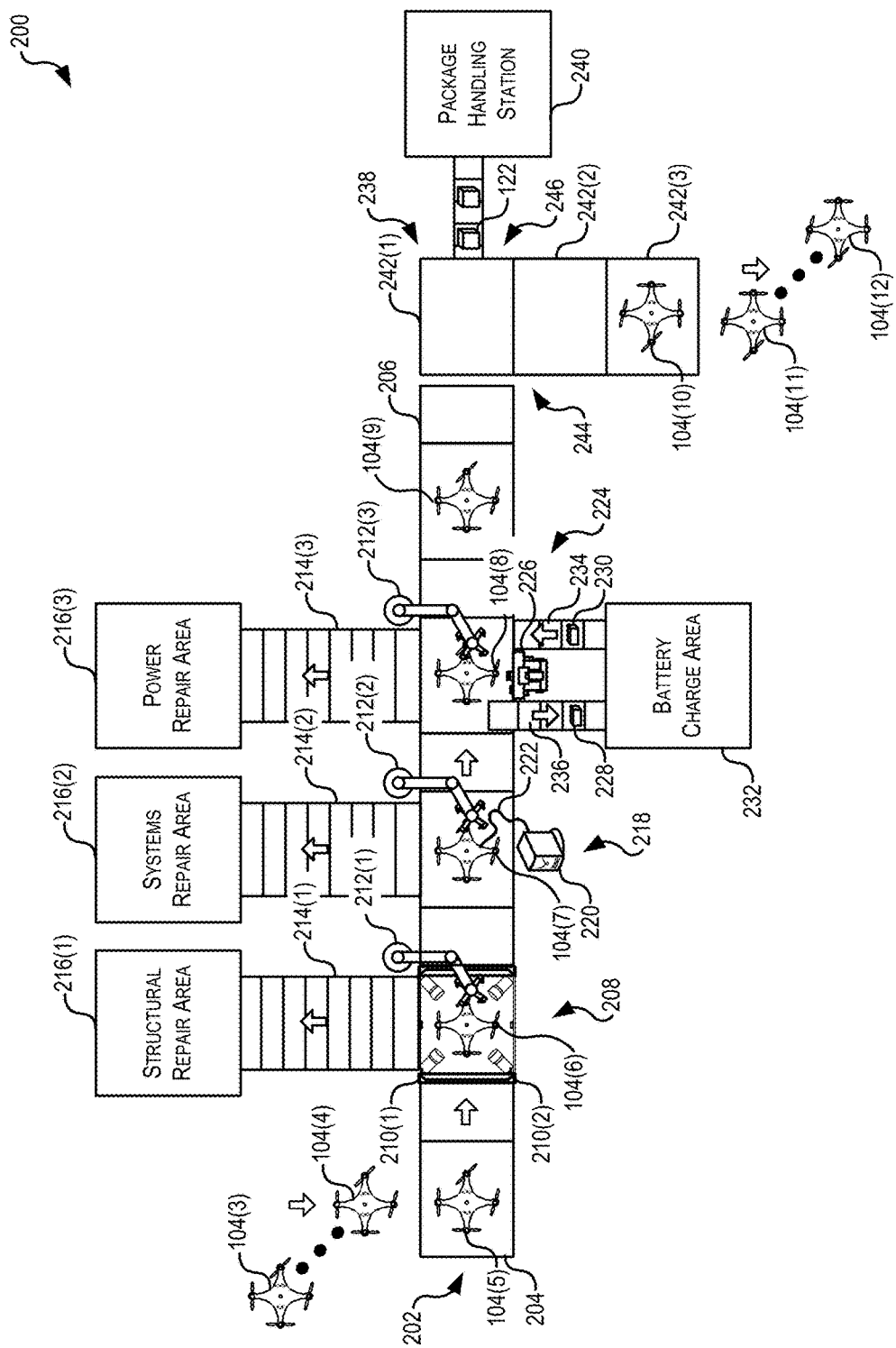
FIG. 2 is a diagram illustrating an example system relating to evaluating and loading UAVs, according to at least one example.

FIG. 2 illustrates an example system 200 relating to evaluating and loading UAVs, according to at least one example. The system 200 is an example of the inventory management system 110, or at least a portion of the inventory management system 110. For example, a majority of the system 200 may be implemented within the UAV fulfillment area 116. To this end, the system 200 includes a master conveyance device 202 configured to move the UAVs 104 from a first end 204 to a second end 206. The master conveyance device 202 may be any suitable movable device such as a conveyor belt formed from any suitable material (e.g., plastic, rubber, etc.), an overhead conveyor chain or belt, and any other suitable conveyance system. The master conveyance device 202 may include a control module capable of controlling at least the speed and direction of the master conveyance device 202. In some examples, the master conveyance device 202 may receive control instructions from the UAV fulfillment management service 108 via the control module.

The UAVs 104 (e.g., the UAV 104(5)) may land on a surface of the master conveyance device 202. In some examples, the UAVs 104 are placed on the master conveyance device 202 by an operator (e.g., a human operator or an automated operator such as a robotic arm). To ensure proper alignment on the surface of the master conveyance device 202, the surface may include a set of alignment fiducials (e.g., markings, guide posts, raised lips or surfaces, grooves, etc.) which correspond to the UAVs 104. Aligning the UAVs 104 on the master conveyance device 202 may include aligning the UAVs 104 with the alignment fiducials. In some examples, as the UAVs 104 move along the master conveyance device 202, they are automatically orientated (e.g., rotated and/or translated) into a proper alignment by engaging with alignment fiducials or other alignment structures. In some examples, the surface may include carriages into which the UAVs 104 may be placed or into which the UAVs 104 may land. In some examples, the UAVs 104 may be placed or land into other carriages which may then be attached to the surface at receiving locations on the surface (e.g., a receptacle corresponding to the other carriages). In any event, the UAVs 104 may be aligned with the master conveyance device 202.

The UAVs 104 may be transported by the master conveyance device 202 to a structural test station 208. The structural test station 208 is an example of a test station 118. The structural test station 208 may include one or more scanners 210(1)-210(N), a few of which are labeled. The scanners 210 may be disposed about the structural test station 208 in any suitable manner in order to scan various sides of the UAV 104(6). For example, six scanners 210 may be provided on each of six sides surrounding the UAV 104(6) (e.g., top, bottom, front, back, right side, and left side). It is understood, however, that fewer than six scanners 210 may also be used. For example, a single scanner 210 may be included at the structural test station 208. In this example, the single scanner 210 (or more than one scanner 210) may be moved relative to the UAV 104(6) in order to scan multiple sides of the UAV 104(6). In some examples, the UAV 104(6) may be moved relative to the scanners 210. In some examples, the scanners 210 may be included in a scanner tunnel or other suitable structure through which the UAV 104 travels on the master conveyance device 202. In some examples, the master conveyor device 202 may include one or more openings through which the scanners 210 may access bottom sides of the UAVs 104. For example, the master conveyance device 202 may be composed of sheets of material with openings formed in the sheets. The UAVs 104 may be placed on the sheets with the openings disposed below the UAVs 104. When the UAVs 104 are located at the structural test station 208, the structural scanners 210 may scan the bottom sides of the UAVs 104 via the openings in the sheets of material. In some examples, the openings are specific to certain stations. For example, an opening in the master conveyance device 202 may be formed at the structural test station 208. In this manner, the scanners 210 may access the bottom side of the UAVs 104.

The scanners 210 may include any suitable combination of sensors, computing devices, and the like to perform structural tests of the UAV 104(6). For example, the scanners 210 may include laser scanners, thermographic scanners, X-ray scanners, structured light scanners, and any other suitable type of scanner capable of identifying structural irregularities in the UAVs 104. The structural test station 208 may include scanners of various types. For example, one or more laser scanners may be provided in addition to an X-ray scanner. In any event, the scanners 210 can look for structural irregularities by scanning the body, frame, wings, propellers, legs, and any other structural parts of the UAV 104(6) and comparing the scans to certain scan criteria, which may include threshold values. For example, the scanners 210 may scan for hairline fractures that meet some criteria (e.g., width, length, depth, shape, likelihood for spreading, etc.). In some examples, the scanners 210 gather scanning information (e.g., output from the structural tests) and pass it on to the UAV fulfillment management service 108 for further analysis (e.g., comparison to criteria and/or thresholds). If the scans reveal that the UAV 104(6) passes certain structural tests, the UAV 104(6) may move along the master conveyance device 202 towards the second end 206.

If the scans reveal that the UAV 104(6) has been compromised (e.g., one or more parts do not pass structural tests), the UAV 104(6) may be removed from the master conveyance device 202 by a robotic manipulator 212(1) and placed on a conveyance device 214(1). The conveyance device 214(1) can move the UAV 104(6) to a structural repair area 216(1). The structural repair area 216(1) is an example of one of the repair areas 114. In some examples, the structural repair area 216 includes a repair station where additional testing and/or repairs on the UAV 104(6) may be performed. Information about why the UAV 104(6) failed the structural test may be provided to the UAV fulfillment management service 108 and/or to a computing device associated with the structural repair area 216(1). In some examples, the UAV 104(6) (and the other UAVs described herein) may be removed from the master conveyance device 202 by a human user, by the respective UAV 104 flying off from the master conveyance device 202, by a ceiling lift, and in any other suitable manner.

In some examples, the conveyance device 214(1) may transport the UAV 104(6) from the structural repair area 216(1) to the structural test station 208, to the first end 204 of the master conveyance device 202, or to any other suitable location. At whichever location, a robotic manipulator may place the UAV 104(6) back on the master conveyance device 202 (e.g., in the event additional testing or repairs at the structural repair area 216(1) reveals that structure of the UAV 104(6) is suitable for flight).

The UAVs 104 may be transported by the master conveyance device 202 to a diagnostic test station 218. The diagnostic test station 218 is an example of a test station 118. In some examples, the diagnostic test station 218 may be placed downstream from the structural test station 208 in order to give the functional components of the UAVs 104 an opportunity to cool before being functionally tested at the diagnostic test station 218. In some examples, between the first end 204 and the diagnostic test station 218, the system 200 also includes means for speeding up the cooling process of components of the UAVs 104. For example, the system 200 may place temporary heat sinks on one or more motors of the UAV 104. The system 200 may also include a cooling device such as a fan or air conditioning unit that blows cool air on the UAVs 104 as they move between stations. In some examples, the system 200 may also include a cooling station at which the UAVs 104 may be cooled, or at least given time to cool off.

Returning now to the diagnostic test station 218, the diagnostic test station 218 may include a diagnostic device 220, including a connector 222. The robotic manipulator 212(2) may be configured to attach the connector 222 to a corresponding port on the UAV 104(7). In some examples, the diagnostic device 220 may connect to the UAV 104(7) in a wireless manner (e.g., without the connector 222) such as over a radio network, a WiFi network, a Bluetooth network, and/or the like. The diagnostic device 220, which may be any suitable computing device configured to connect to and run diagnostic tests on the UAV 104(7), may conduct certain diagnostic tests of systems of the UAV 104(7) while the UAV 104(7) is located at the diagnostic test station 218. For example, the diagnostic device 220 may test certain functional systems of the UAV 104(7) (e.g., communication system, navigation system, avionics system, obstacle detection and avoidance system, propulsion system, power management system, package retention system, and/or any other suitable system of the UAV 104(7)). The diagnostic device 220 may be configured to compare the results of the tests to diagnostic criteria and/or threshold values to determine whether the UAV 104(7) passes or fails the tests. In some examples, the diagnostic device 220 gathers diagnostic information (e.g., output from the tests) and passes it to the UAV fulfillment management service 108 for further analysis (e.g., comparison to criteria and/or thresholds). If the diagnostic tests reveal that the UAV 104(7) passes the diagnostic tests, the UAV 104(7) may move along the master conveyance device 202 towards the second end 206.

If the diagnostic tests reveal that the UAV 104(7) has been compromised (e.g., one or more functional systems do not pass one or more diagnostic tests), the UAV 104(7) may be removed from the master conveyance device 202 by the robotic manipulator 212(2) and placed on the conveyance device 214(2). The conveyance device 214(2) can move the UAV 104(7) to the systems repair area 216(2). The systems repair area 216(2) is an example of one of the repair areas 114. In some examples, the systems repair area 216(2) includes a repair station where additional testing and/or repairs on the UAV 104(7) may be performed. Information about why the UAV 104(7) failed any one of the diagnostic tests may be provided to the UAV fulfillment management service 108 and/or to a computing device associated with the systems repair area 216(2).

In some examples, the conveyance device 214(2) may transport the UAV 104(7) from the systems repair area 216(2) to the diagnostic test station 218, to the first end 204 of the master conveyance device 202, or to any other suitable location. At whichever location, a robotic manipulator may place the UAV 104(7) back on the master conveyance device 202 (e.g., in the event additional testing or repairs at the systems repair area 216(2) reveals that the functional systems of the UAV 104(7) are suitable for flight).

In some examples, the UAV 104(7) may provide diagnostic information in real-time while in its flight mode (e.g., prior to arriving at the facility where the system 200 is located). This diagnostic information may be accessed by the diagnostic device 220 as part of running functional tests on the UAV 104(7). In some examples, the diagnostic information is gathered during flight and saved to a log file. This log file may be transferred to the diagnostic device 220 from the UAV 104(7) when the diagnostic device 220 connects to the UAV 104(7). In any event, the diagnostic information may be used to identify or confirm functional irregularities of the systems of the UAV 104(7).

The UAVs 104 may be transported by the master conveyance device 202 to a power station 224. The power station 224 is an example of a test station 118. In some examples, the power station 224 may be placed downstream from the structural test station 208 and the diagnostic test station 218 to avoid performing power-related operations on a UAV 104 that is deficient structurally and/or functionally. Power-related operations may include testing a power system of the UAV 104(8), removing spent power sources (e.g., battery packs) from the UAV 104(8), and installing new or otherwise charged power sources to the UAV 104(8). To this end, the power station 224 includes a power device 226. The power device 226 may be configured to perform the power-related operations.

For example, the power device 226 may include a robotic component that is configured to remove spent power sources 228 and replace them with new power sources 230. The new power sources 230 may be transported to the power station 224 from a battery charge area 232 via an inbound conveyance device 234. The spent power sources 228 may be transported from the power station 224 to the battery charge area 232 via an outbound conveyance device 236. The outbound conveyance device 236 may commence at an elevation above or equal to a vertical elevation of the top surface of the master conveyance device 202. The power device 226 may include one or more arms, mechanisms, or the like to access a power source compartment of the UAV 104(8) and remove the spent power sources 228. For example, the power device 226 may access an underside of the UAV 104(8) from below the master conveyance device 202 by passing the one or more arms through an opening in the master conveyance device 202 disposed below the UAV 104(8). Once the spent power sources 228 have been removed from the UAV 104(8), the power device 226 may place the spent power sources 228 on the outbound conveyance device 236.

The inbound conveyance device 234 may terminate at an elevation below the vertical elevation of the master conveyance device 202. In this manner, the inbound conveyance device 234 may deliver the new power sources 230 to the power device 226 at a location below the UAV 104(8). The power device 226 may receive the new power sources 230 and position the new power sources 230 on one or more lifters disposed below the UAV 104(8). The one or more lifters, which may also be the one or more arms discussed previously, may be used to install the new power sources 230 into the power source compartment of the UAV 104(8). The one or more lifters may access the power source compartment of the UAV 104(8) via the opening in the master conveyance device 202. In some examples, the power source compartment may be located on the side or top of the UAV 104(8). In this example, the power device 226 may access the power source compartment from the top or side as opposed to via the opening below the UAV 104(8).

The power device 226 may also be configured to connect to the UAV 104(8) to test the power system of the UAV 104(8). For example, the power device 226 may plug a connector into a port on the UAV 104(8) and run one or more power tests to ensure that the new power sources 230 are providing appropriate voltage, ensure that the UAV 104(8) is receiving power, etc. The power device 226 may be configured to compare the results of the power tests to power criteria and/or threshold values to determine whether the UAV 104(8) passes or fails the tests. In some examples, the power device 226 gathers power information (e.g., output from the tests) and passes it to the UAV fulfillment management service 108 for further analysis (e.g., comparison to criteria and/or thresholds). If the power tests reveal that the UAV 104(8) passes the power tests, the UAV 104(8) may move along the master conveyance device 202 towards the second end 206.

If the power tests reveal that the UAV 104(8) fails one of the power tests, the UAV 104(8) may be removed from the master conveyance device 202 by the robotic manipulator 212(3) and placed on the conveyance device 214(3). The conveyance device 214(3) can move the UAV 104(8) to the power repair area 216(3). The power repair area 216(3) is an example of one of the repair areas 114. In some examples, the power repair area 216(3) includes a repair station where additional testing and/or repairs on the UAV 104(8) may be performed. Information about why the UAV 104(8) failed any one of the power tests may be provided to the UAV fulfillment management service 108 and/or to a computing device associated with power repair area 216(3).

In some examples, the conveyance device 214(3) may transport the UAV 104(8) from the power repair area 216(3) to the power station 224, to the first end 204 of the master conveyance device 202, or to any other suitable location. At whichever location, a robotic manipulator may place the UAV 104(8) back on the master conveyance device 202 (e.g., in the event additional testing or repairs at the power repair area 216(3) reveals that the power system of the UAV 104(8) is suitable for flight). In some examples, the battery charge area 232 and the power repair area 216(3) are adjacent to each other, or otherwise combined at the same area.

The system 200 also includes a UAV loading structure 238 and a package handling station 240. The UAV loading structure 238 may include one or more structures 242 configured to retain the UAVs 104 while packages 122 are loaded into package compartments of the UAVs 104 and move the UAVs 104 from a package loading location to a launch location where the UAVs 104 can be cleared for takeoff. The UAV loading structure 238 is an example of a moveable device.

The UAVs 104 may be loaded into the UAV loading structure 238 at a first side 244 of the UAV loading structure 238 and into a first structure 242(1). The packages 122 may be transported from the package handling station 240 and loaded into the UAVs 104 from a second side 246 of the UAV loading structure 238. Once loaded, the UAVs 104 may move through the UAV loading structure 238 until they arrive at a top location of the structure 242(3). The structure 242(3) may include a raised launch platform from which the UAVs 104 (e.g., the UAV 104(10)) may be launched. The UAV loading structure 238 and the package handling station 240 will be described in further detail with reference to FIG. 3.

Figure 3:
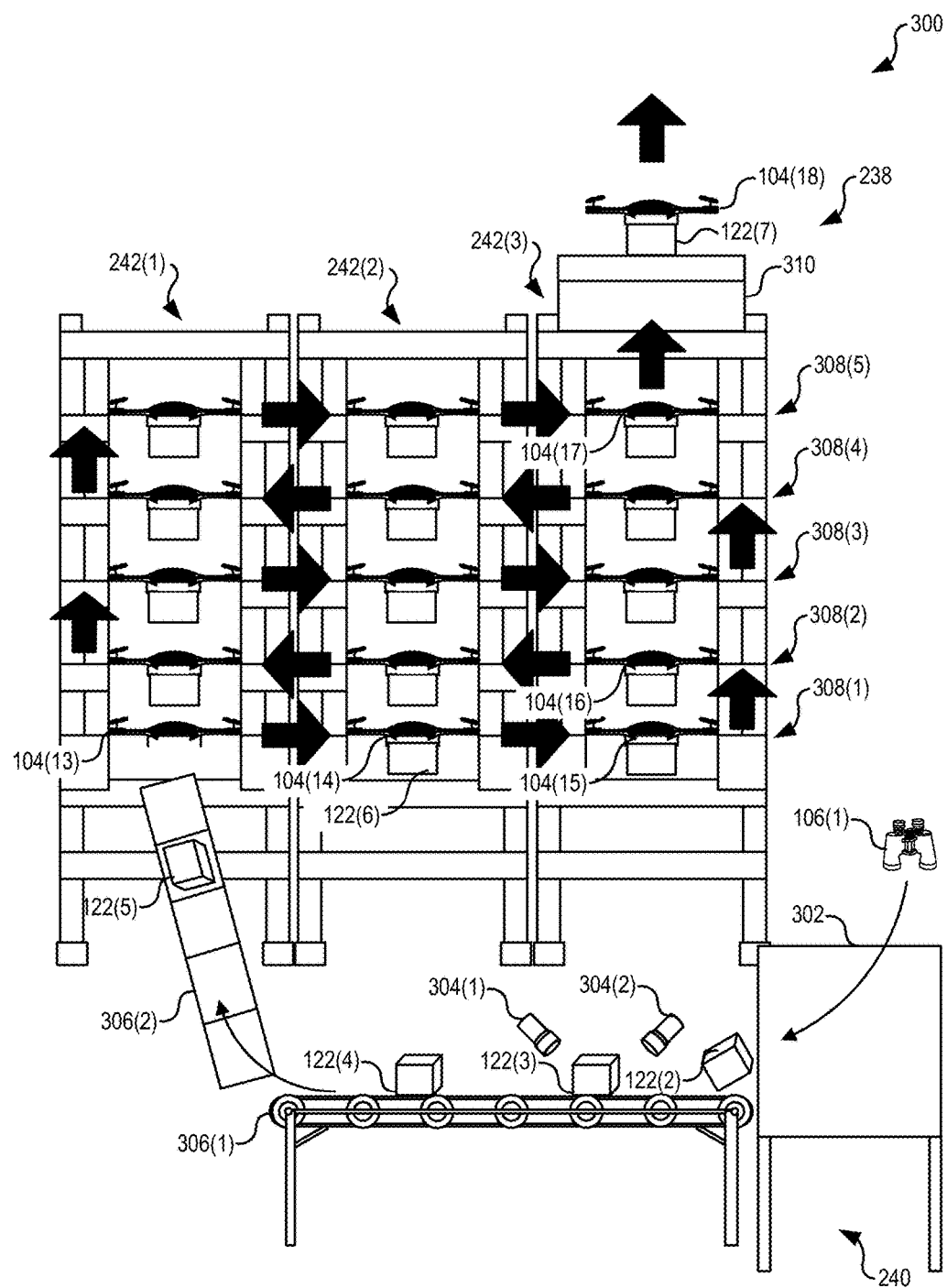
FIG. 3 is a diagram illustrating an example system for implementing techniques relating to evaluating and loading UAVs, according to at least one example.

FIG. 3 illustrates an example system 300 relating to evaluating and loading UAVs, according to at least one example. The system 300 illustrates the second side 246 of the UAV loading structure 238 and also includes the package handling station 240. Turning first to the package handling station 240, this station may include a packaging device 302, one or more scanners 304, and one or more conveyance devices 306.

The packaging device 302 may be configured to scan items 106 as they enter the packaging device 302 or while within the packaging device 302. In this manner, the system may detect which items are being packaged and to what customer orders the items 106 belong.

The packaging device 302 may also take the items 106 such as item 106(1) and package the items 106 into packages. Thus, after the items 106 are brought to the packaging device 302 in any suitable manner, the items 106 are loaded into the packaging device 302. The packaging device 302 automatically puts the items 106 into boxes (e.g., standard-sized cardboard boxes or other similar wrapping), secures the boxes with packing tape, places any packaging labels on the boxes, and performs any other operation associated with the items 106 to prepare the packages 122.

The scanners 304 may be configured to scan the packaging labels applied to the packages 122 by the packaging device 302. The scanners 304 may transmit information (e.g., delivery instructions) associated with the packaging labels to the UAVs 104. For example, the scanners 304 may be configured to transmit delivery instructions to the UAVs 104 using radio-frequency technology (e.g., Radio Frequency Identification) or some other wireless transmission medium. The delivery instructions may include a geographic delivery location (e.g., a set of coordinates) corresponding to a customer address, a route for flying to the geographic location, any specific delivery instructions, order information, and any other information.

The conveyance devices 306 may be configured to move the packages 122 from the packaging handling station 240 to the UAV loading structure 238. In some examples, a single conveyance device 306 is utilized. In the illustrated example, the conveyance device 306(1) moves the packages 122 from the packaging handling station 240 to enable scanning by the scanners 304. The conveyance device 306(2) receives packages 122 from the conveyance device 306(1) and moves the packages 122 towards the UAVs 104. The conveyance device 306(2) may be positioned to deliver the packages 122 at a precise location with respect to the UAVs 104. In some examples, the conveyance device 306(1) is positionable via one or more actuators to position the conveyance device 306(1) at the appropriate location and elevation with respect to the UAV 104(13) to enable proper loading of the package 122(5) into the package compartment of the UAV 104(13). In some examples, the UAV loading structure 238 may include a plurality of vertical slots or vertical levels 308(1)-308(N). The packages 122 and the UAVs 104 may be loaded at one of the lower levels 308 (e.g., the level 308(1)).

The package handling station 240 may also include the ability to wirelessly transfer information to the UAVs 104. This information may include delivery instructions for shipping the packages 122 to customers. In some examples, the information may be transferred using RFID technology, Near Field Communication (NFC) technology, Bluetooth, an ad-hoc network, and in any other suitable manner. In some examples, the information may be transferred over a wired connection.

As introduced previously, the UAVs 104 may be loaded into the UAV loading structure 238 from the first side 244 of the UAV loading structure 238 (not illustrated in FIG. 3). Loading the UAVs 104 may include placing the UAVs 104 into trays in the UAV loading structure 238. The trays may be adapted to receive the UAVs 104 and enable the packages 122 to be loaded into the package compartments while the UAVs 104 are held. In some examples, the trays include a set of structures (e.g., hooks, raised tabs, grooves, lips, or the like) configured to hold the UAVs 104 by their frames or other solid structures (e.g., wings, hooks, etc.). The UAV loading structure 238 may include a movement structure that includes a series of sprockets or gears connected by one or more belts, chains, or the like that follows the path illustrated by the arrows. The trays may be connected to this movement structure and thus be moved along the path. In some examples, the movement structure follows a serpentine path from the position occupied by the UAV 104(13) to the position occupied by the UAV 104(17). While on this path, the trays (and thus the UAVs 104) may remain upright. Thus, the trays may be connected to the movement structure using a moveable knuckle or other joint to enable some degree of rotation. In some examples, the movement structure may be a serpentine conveyor belt. In this manner, the UAVs 104 may be moved along the path illustrated by the arrows (e.g., sideways and vertically).

Returning to package loading, the package compartment of the UAV 104(13) may include an actuator that activates a switch to close compartment doors once the package 122(5) is loaded. Once the compartment doors are closed, as illustrated by the arrows, the UAV 104(13) advances sideways and horizontally (e.g., to the right in FIG. 3 to the position of the UAV 104(14)) to allow another UAV 104 to be loaded with its corresponding package 122. Thus, the UAVs 104 with packages advance horizontally across the structures 242(1)-242(3). Once in the position occupied by the UAV 104(15), as illustrated by the arrows, the UAV 104(15) advances vertically up one level (e.g., upwards in FIG. 3 to the position occupied by the UAV 104(16) to the level 308(2)) to allow another UAV 104 to be loaded with its corresponding package 122. The UAVs 104 in the level 308(2) move to the left until they reach the structure 242(1) where they are lifted up one level to the level 308(3). This process continues until the UAVs 104 have moved through the UAV loading structure 238 to the position of the UAV 104(17). The position of the UAV 104(17) in the level 308(5) may be the penultimate position prior to taking off. In order to take off, the UAV 104(17) may be lifted vertically by a lift elevator of a launch platform 310 to the position occupied by the UAV 104(18). The UAV 104(18) is resting on an upper surface of the launch platform 310. The UAVs 104 may launch from the launch platform 310 to perform their delivery missions.

Figure 4:
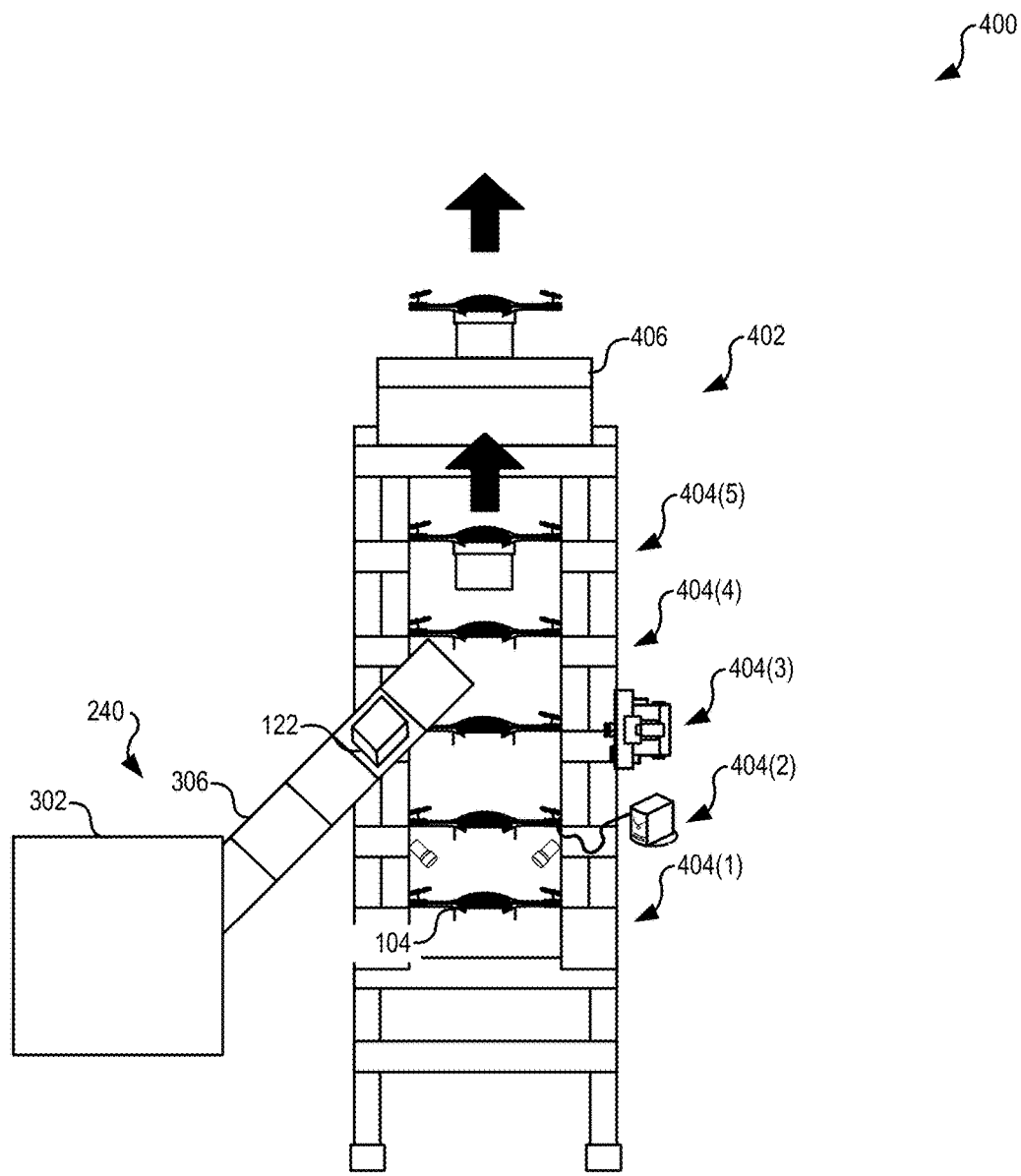
FIG. 4 is a diagram illustrating an example system for implementing techniques relating to evaluating and loading UAVs, according to at least one example.

FIG. 4 illustrates an example system 400 relating to evaluating and loading UAVs, according to at least one example. The system 400 includes an integrated UAV evaluation and loading structure 402 and the package handling station 240. The integrated UAV evaluation and loading structure 402 may include functionality of the UAV loading structure 238 coupled with the functionality of the stations 208, 218, and 224. In particular, the integrated UAV evaluation and loading structure 402 may include a plurality of vertical levels 404(1)-404(5), with a launch platform 406 disposed above the top level 404(5). The launch platform 406 is an example of the launch platform 310.

The UAVs 104 may be loaded into the integrated UAV evaluation and loading structure 402 at the level 404(1) from the opposite side shown. For example, a robotic manipulator may place the UAVs 104 into a tray supported within the integrated UAV evaluation and loading structure 402 at the level 404(1). The UAVs 104 may then move upwards in a shaft of the integrated UAV evaluation and loading structure 402 from the level 404(1) to the launch platform 406.

At the level 404(1) or at some other level, structural scanning can be performed similarly as described with respect to the structural test station 208. If the UAV 104 passes the structural tests, it may be moved up one level to the level 404(2). If the UAV 104 fails a test at the structural test station on the level 404(1), the failing UAV 104 may be removed from the integrated UAV evaluation and loading structure 402 by a robotic manipulator.

At the level 404(2) or at some other level, functional testing can be performed similarly as described with respect to the diagnostic test station 218. If the UAV 104 passes the functional tests, it may be moved up one level to the level 404(3). If the UAV 104 fails a test at the diagnostic test station on the level 404(2), the failing UAV 104 may be removed from the integrated UAV evaluation and loading structure 402 by a robotic manipulator.

At the level 404(3) or at some other level, one or more power-related operations may be performed similarly as described with respect to the power station 224. Thus, spent power sources may be replaced with new power sources, and power tests may be performed. If the UAV 104 passes the power tests, it may be moved up one level to the level 404(4). If the UAV 104 fails a test at the power station on the level 404(3), the failing UAV 104 may be removed from the integrated UAV evaluation and loading structure 402 by a robotic manipulator.

At the level 404(4) or at some other level, the package 122 may be loaded into the UAV 104 as described herein with respect to the package handling station 240. For example, the packaging device 302 may package the items 106 and the conveyance device 306 may convey packages 122 towards the UAVs 104. The conveyance device 306 may be configured to place the packages 122 at a position below the UAVs 104 so that the packages 122 may be loaded into the UAVs 104.

After the packages 122 are loaded, the UAVs 104 may continue to move up the integrated UAV evaluation and loading structure 402 until they reach the launch platform 406.

Figure 5:
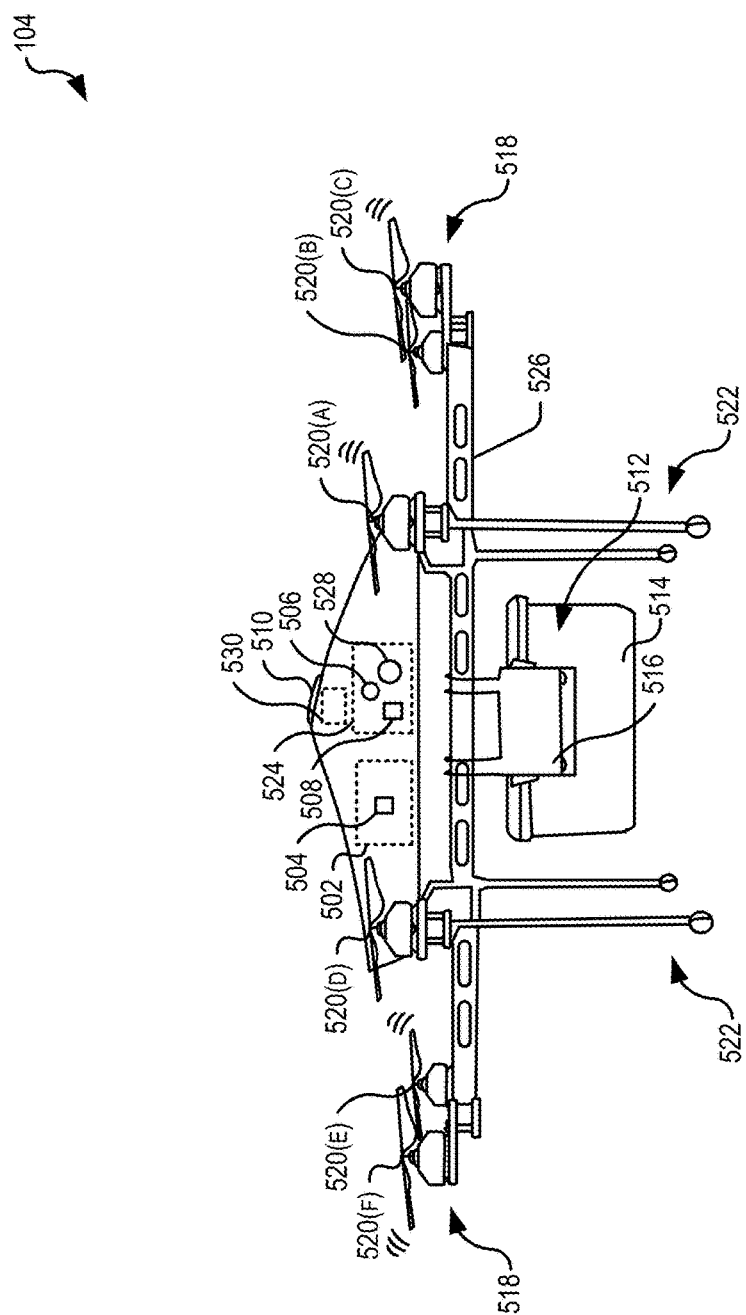
FIG. 5 is an example UAV for implementing techniques relating to evaluating and loading UAVs, according to at least one example.

FIG. 5 illustrates the UAV 104 for implementing techniques relating to evaluating and loading UAVs, according to at least one example. The UAV 104 may be designed in accordance with commercial aviation standards and may include multiple redundancies to ensure reliability. For purposes of this specification, the UAV 104 may include a plurality of systems or subsystems operating under the control of, or at least partly under the control of, a management system 502. The management system 502 may include a UAV management device 504 (e.g., an onboard computer) for autonomously or semi-autonomously controlling and managing the UAV 104 and, in some examples, for enabling remote control by a pilot (e.g., an operator). Portions of the management system 502, including the UAV management device 504, may be housed under top cover 510. As used herein, the management system 502 may include an avionics system, a power management system including power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 104, radio-frequency identification (RFID) capability (not shown), and interfaces capable of speech interpretation and recognition (not shown).

The UAV 104 may also include a communication system 524 housed within the top cover 510. The communication system 524 may include one or more light sensors 528 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 506 (e.g., microphone, noise filters, and other sensors for capturing sound), and one or more output devices 508 (e.g., microphone, speaker, laser projector, light projector, and other devices for outputting communication information). The management system 502 may be configured to receive information and provide information via components of the communication system 524. For example, the UAV 104 may support two-way communication with operators. Two-way communication may be beneficial for verifying operators' identities that interact with the UAV 104, for posing questions to operators, and for providing instructions to operators. In some examples, the communication system 524 may operate semi-autonomously or autonomously.

As shown in FIG. 5, the UAV 104 may also include a retaining system 512. The retaining system 512 may be configured to retain payload 514 (e.g., the package 122). In some examples, the retaining system 512 may retain the payload 514 using friction, vacuum suction, opposing arms, magnets, within a compartment, and other retaining methods. As illustrated in FIG. 5, the retaining system 512 may include two opposing arms 516 (only one is illustrated) configured to retain the payload 514. The UAV management device 504 may be configured to control at least a portion of the retaining system 512. In some examples, the retaining system 512 may be configured to release the payload 514 in one of a variety of ways. For example, the retaining system 512 (or other system of the UAV 104) may be configured to release the payload 514 with a winch and spool system, by the retaining system 512 releasing the payload above the ground, and other methods of releasing the payload. In some examples, the retaining system 512 may operate semi-autonomously or autonomously.

In FIG. 5, the payload 514 is illustrated as a delivery box. In some examples, the delivery box may include one or more packages or items intended for delivery to a recipient using the techniques described herein. The payload 514, whether as a delivery box or otherwise, may be configured for delivery using a variety of different methods. For example, the payload 514 may include a parachute that opens and slows the payload's 514 descent as it falls to its delivery location. In some examples, the payload 514 may include padding surrounding its package to reduce the impact of a drop from the UAV 104 above the ground. The UAV 104 may also deliver the payload 514 by fully landing on the ground and releasing the retaining system 512.

Further, the UAV 104 may a include propulsion system 518. In some examples, the propulsion system 518 may include rotary blades or otherwise be a propeller-based system. As illustrated in FIG. 5, the propulsion system 518 may include a plurality of propulsion devices, a few of which, 520(A)-520(F), are shown in this view. Each propulsion device may include one or more propellers, a motor, wiring, a balance system, a control mechanism, and other features to enable flight. In some examples, the propulsion system 518 may operate at least partially under the control of the UAV management device 504. In some examples, the propulsion system 518 may be configured to adjust itself without receiving instructions from the UAV management device 504. Thus, the propulsion system 518 may operate semi-autonomously or autonomously. The propulsion system 518 may enable multi-directional flight of the UAV 104 (e.g., by adjusting each propulsion device individually).

The UAV 104 may also include a landing structure 522. The landing structure 522 may be adequately rigid to support the UAV 104 and the payload 514. The landing structure 522 may include a plurality of elongated legs which may enable the UAV 104 to land on and take off from a variety of different surfaces. The plurality of systems, subsystems, and structures of the UAV 104 may be connected via frame 526. The frame 526 may be constructed of a rigid material and be capable of receiving, via different connections, the variety of systems, sub-systems, and structures. For example, the landing structure 522 may be disposed below the frame 526 and, in some examples, may be formed from the same material and/or same piece of material as the frame 526. The propulsion system 518 may be disposed radially around a perimeter of the frame 526 or otherwise distributed around the frame 526.

The UAV 104 may also include a deployable slowing device 530. The deployable slowing device 530 may include any suitable device capable of slowing down the descent of the UAV 104 when deployed. For example, the deployable slowing device 530 may include a streamer, a parachute, or other comparable structure coupled to a deploying means. The deploying means may be electrically actuated, mechanically actuated, and/or actuated in any other suitable manner. In some examples, the UAV 104 may include more than one deployable slowing devices 530. For example, a plurality of such devices 530 may be deployed about the perimeter of the UAV 104 (e.g., at each of the propulsion devices 520). In some examples, the deployable slowing device 530 may be deployed when the UAV 104 switches from mission mode to safety mode. In some examples, deploying the deployable slowing device 530 is just one of a plurality of safety actions that may be performed in response to detection of a hostile takeover attempt.

Figure 6:
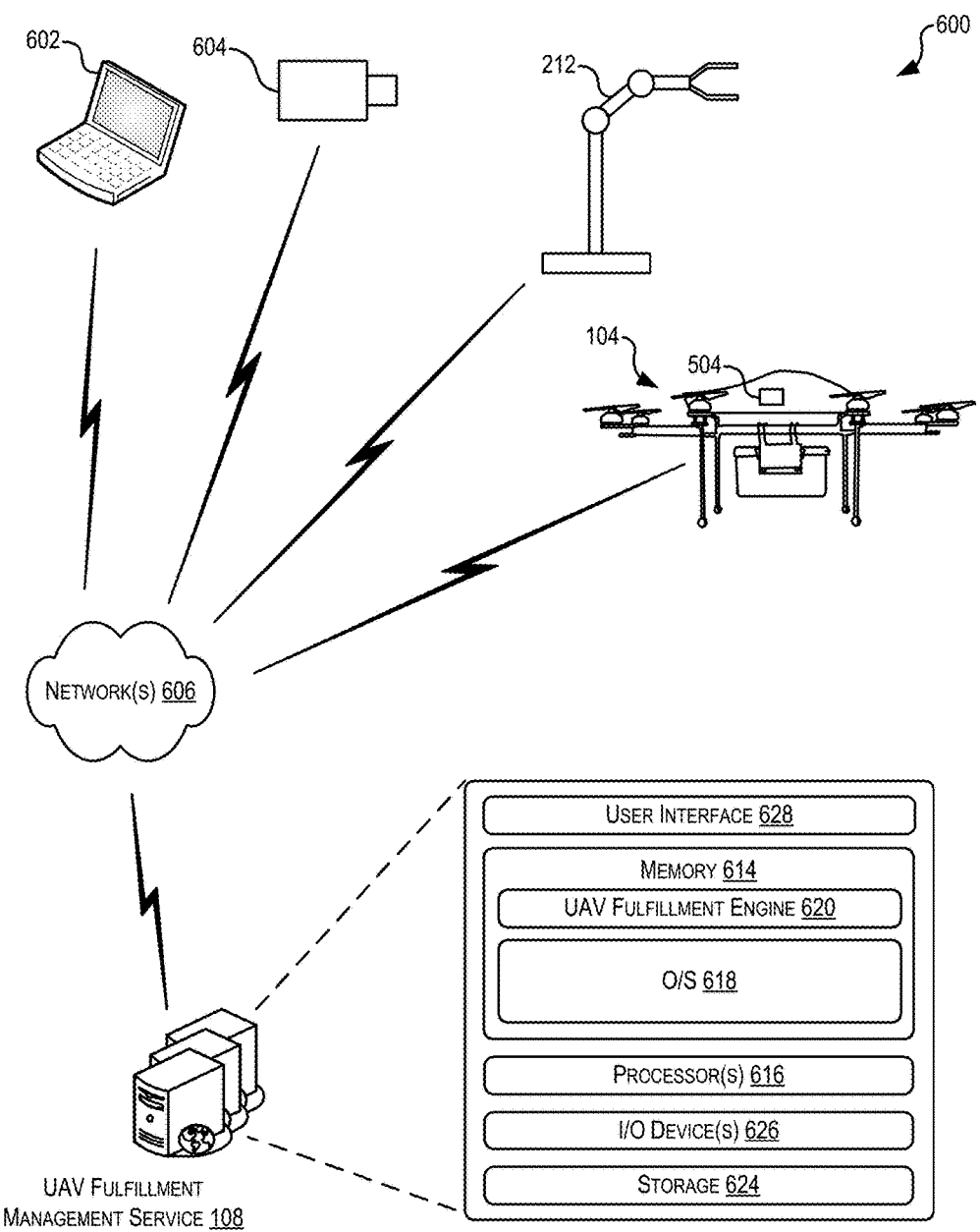
FIG. 6 is an example schematic architecture or system and devices for implementing techniques relating to evaluating and loading UAVs, according to at least one example.

FIG. 6 illustrates an example architecture or system 600 for implementing techniques relating to evaluating and loading UAVs, according to at least one example. The architecture 600 may include the UAV fulfillment management service 108 in communication with one or more user devices 602, one or more robotic manipulators 212, and one or more scanners 604 (e.g., the scanners 210, the scanners 304, and other scanners and sensors) via one or more networks 606 (hereinafter, "the network 606"). The user device 602 may be operable by a user to interact with the UAV fulfillment management service 108, the robotic manipulator 212, and/or the scanner 604. The network 606 may include any one or a combination of many different types of networks, such as radio networks, cable networks, the Internet, wireless networks, cellular networks, and other private, and/or public networks.

The user device 602 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the UAV fulfillment management service 108, the robotic manipulator 212, and/or the scanner 604 via the network 606 in accordance with techniques described herein. In some examples, the user device 602 may be implemented as part of the diagnostic device 220, the power device 226, local devices that interact with or manage local aspects of the robotic manipulators 212, and/or any other suitable computing device described herein.

The robotic manipulator 212 may be any suitable robotic manipulator (e.g., Cartesian robot, cylindrical robot, spherical robot, articulated robot, parallel robot, SCARA robot, anthropomorphic robot, and any other suitable robotic manipulator and/or robotic arm). The robotic manipulator 212 may include any suitable type and number of sensors disposed throughout the robotic manipulator 212 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 212. The sensors may be in communication with a management device that is local to the robotic manipulator (e.g., a type of user device 602) and/or may be in direct communication with the UAV fulfillment management service 108. In this manner, the management device may control the operation of the robotic manipulator 212 based at least in part on sensing information received from the sensors. The sensing information may also be used as feedback to adjust the grasps used by an end effector to pick up and move the UAVs 104.

The UAV fulfillment management service 108 may include one or more server computers, perhaps arranged in a cluster of servers or as a server farm. These servers may be configured to perform computing operations as described herein. In some examples, the servers (and the components thereof) may be distributed throughout more than one location. The servers may also be virtual computing resources. The UAV fulfillment management service 108 may be implemented as part of an inventory management system that is associated with an electronic marketplace. Through the electronic marketplace, users may place orders for items. In response, the inventory management system may determine delivery instructions for retrieving the items from their physical storage locations (e.g., within the inventory storage area 112) and coordinating their shipping (e.g., via the UAVs 104 or otherwise).

The UAV fulfillment management service 108 may include at least one memory 614 and one or more processing units (or processor(s)) 616. The processor 616 may be implemented as appropriate in hardware, computer-executable instructions, software, firmware, or combinations thereof. Computer-executable instruction, software, or firmware implementations of the processor 616 may include computer-executable or machine-executable instructions written in any suitable programming language to perform the various functions described. The memory 614 may include more than one memory and may be distributed throughout the UAV fulfillment management service 108. The memory 614 may store program instructions that are loadable and executable on the processor(s) 616, as well as data generated during the execution of these programs. Depending on the configuration and type of memory including the UAV fulfillment management service 108, the memory 614 may be volatile (such as random access memory (RAM)) and/or non-volatile (such as read-only memory (ROM), flash memory, or other memory). The memory 614 may include an operating system 618 and one or more application programs, modules, or services for implementing the features disclosed herein including at least a UAV fulfillment engine 620. As described in detail herein, the UAV fulfillment engine 620 may be configured to manage the operation of evaluating the UAVs 104, reloading the UAVs 104 with packages, and otherwise fulfilling orders using the UAVs 104.

The UAV fulfillment management service 108 may also include additional storage 624, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 624, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the UAV fulfillment management service 108.

The UAV fulfillment management service 108 may also include input/output (I/O) device(s) and/or ports 626, such as for enabling connection with a keyboard, a mouse, a pen, a voice input device, a touch input device, a display, speakers, a printer, or other I/O device.

The UAV fulfillment management service 108 may also include a user interface 628. The user interface 628 may be utilized by an operator or other authorized user to access portions of the UAV fulfillment management service 108. In some examples, the user interface 628 may include a graphical user interface, web-based applications, programmatic interfaces such as application programming interfaces (APIs), or other user interface configurations.

Figure 7:
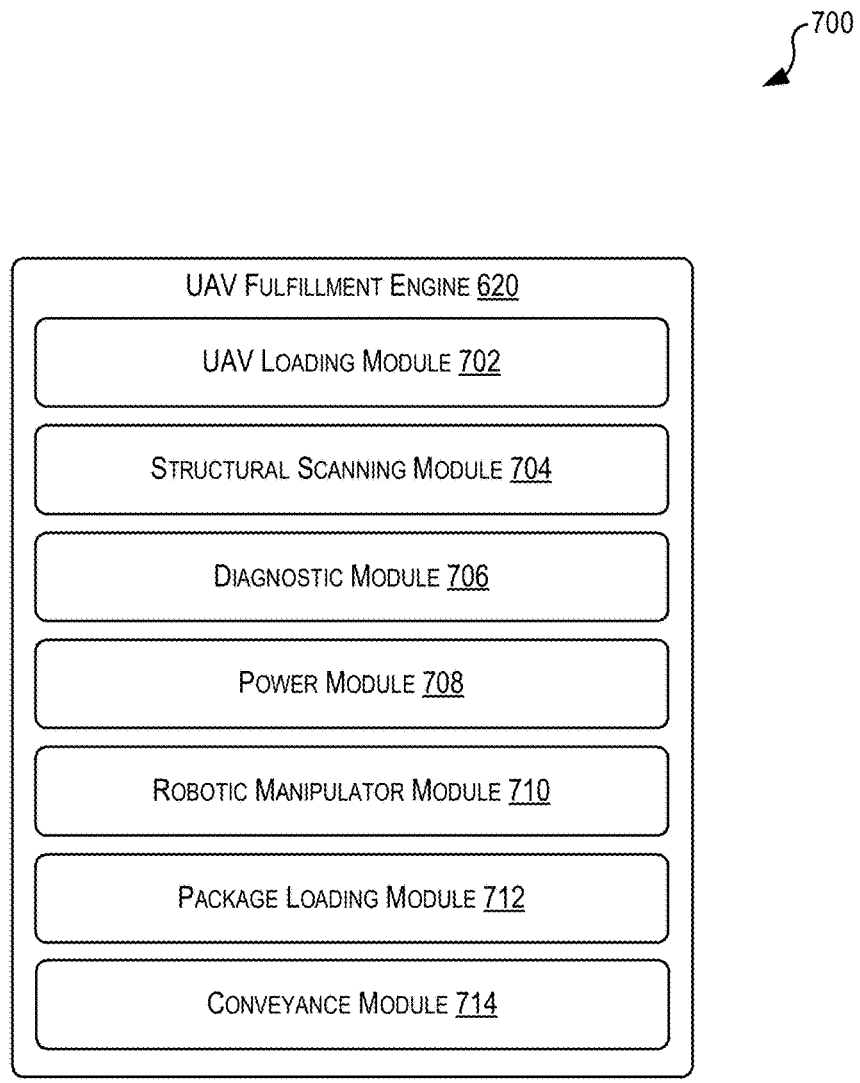
FIG. 7 is an example device for implementing techniques relating to evaluating and loading UAVs, according to at least one example.

FIG. 7 illustrates an example device 700 including the UAV fulfillment engine 620, according to at least one example. The UAV fulfillment engine 620 may be configured to manage one or more sub-modules, components, and/or services directed to examples disclosed herein. In some examples, the UAV fulfillment engine 620 may include a UAV loading module 702, a structural scanning module 704, a diagnostic module 706, a power module 708, a robotic manipulator module 710, a package loading module 712, and a conveyance module 714. While these modules are illustrated in FIG. 7 and will be described as performing discrete tasks with reference to the flow charts, it is understood that FIG. 7 illustrates example configurations and other configurations performing other tasks and/or similar tasks as those described herein may be implemented according to the techniques described herein.

The UAV loading module 702 may be configured to manage the loading of the UAVs 104 onto and off of the master conveyance device 202. In some examples, the UAV loading module 702 may control the UAVs 104 as they enter a facility and navigate the UAVs 104 onto the master conveyance device 202. In some examples, the UAV loading module 702 may manage loading of the UAVs 104 into the UAV loading structure 238. The UAV loading module 702 may also manage the operation of the UAV loading structure 238 (e.g., the movement of the trays sideways and/or upward within the UAV loading structure 238).

The structural scanning module 704 may be configured to manage the operation of elements of the structural test station 208. For example, the structural scanning module 704 may instruct the scanners 210 to scan the UAVs 104. The structural scanning module 704 may also process scan information received from the scanners 210.

The diagnostic module 706 may be configured to manage the operation of elements of diagnostic test station 218. For example, the diagnostic module 706 may instruct the diagnostic device 220 to perform one or more functional tests on the UAVs 104. The diagnostic module 706 may also process diagnostic information received from the diagnostic device 220.

The power module 708 may be configured to manage the operation of elements of the power station 224. For example, the power module 708 may instruct the power device 226 to perform power tests on the UAVs 104 and replace batteries in the UAVs 104. The power module 708 may also process power information received from the power device 226.

The robotic manipulator module 710 may be configured to manage the operation of the robotic manipulators 212 and other robotic devices described herein (e.g., lifters, arms, actuators, platforms, etc.). For example, in response to receiving an instruction generated by the structural scanning module 704, the robotic manipulator module 710 may remove a UAV 104 from the master conveyance device 202 and place the UAV 104 on the conveyance device 214(1).

The package loading module 712 may be configured to manage the operation of the package handling station 240. For example, the package loading module 712 may manage the packaging of the items 106 into the packages 122. The package loading module 712 may also receive delivery instructions associated with the items 106, the packages 122, and customer orders to which the items 106 and the packages 122 belong, and provide the delivery instructions to the UAVs 104.

The conveyance module 714 may be configured to manage the operation of the conveyance devices described herein. This may include direction of movement, speed of movement, stops in movement, and the like.

Figure 8:
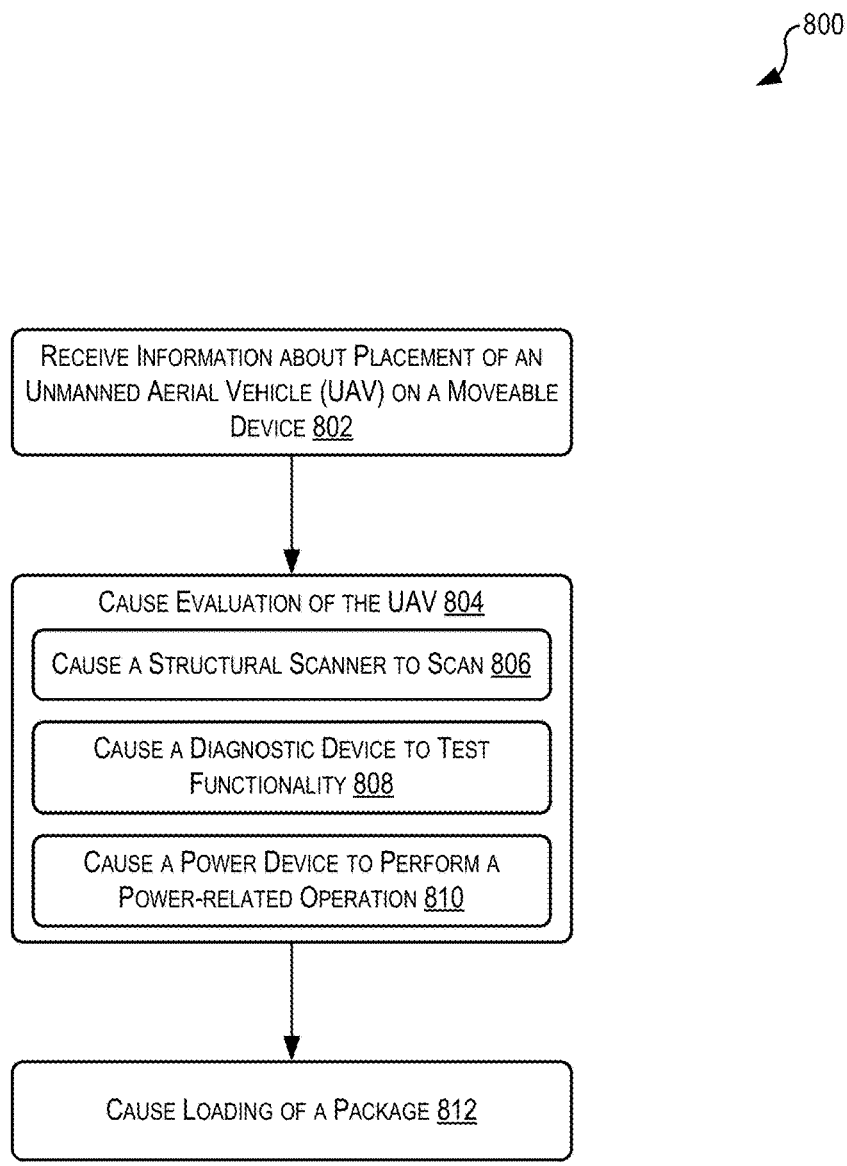
FIG. 8 is a flow diagram depicting example acts for implementing techniques relating to evaluating and loading UAVs, according to at least one example.
Figure 9:
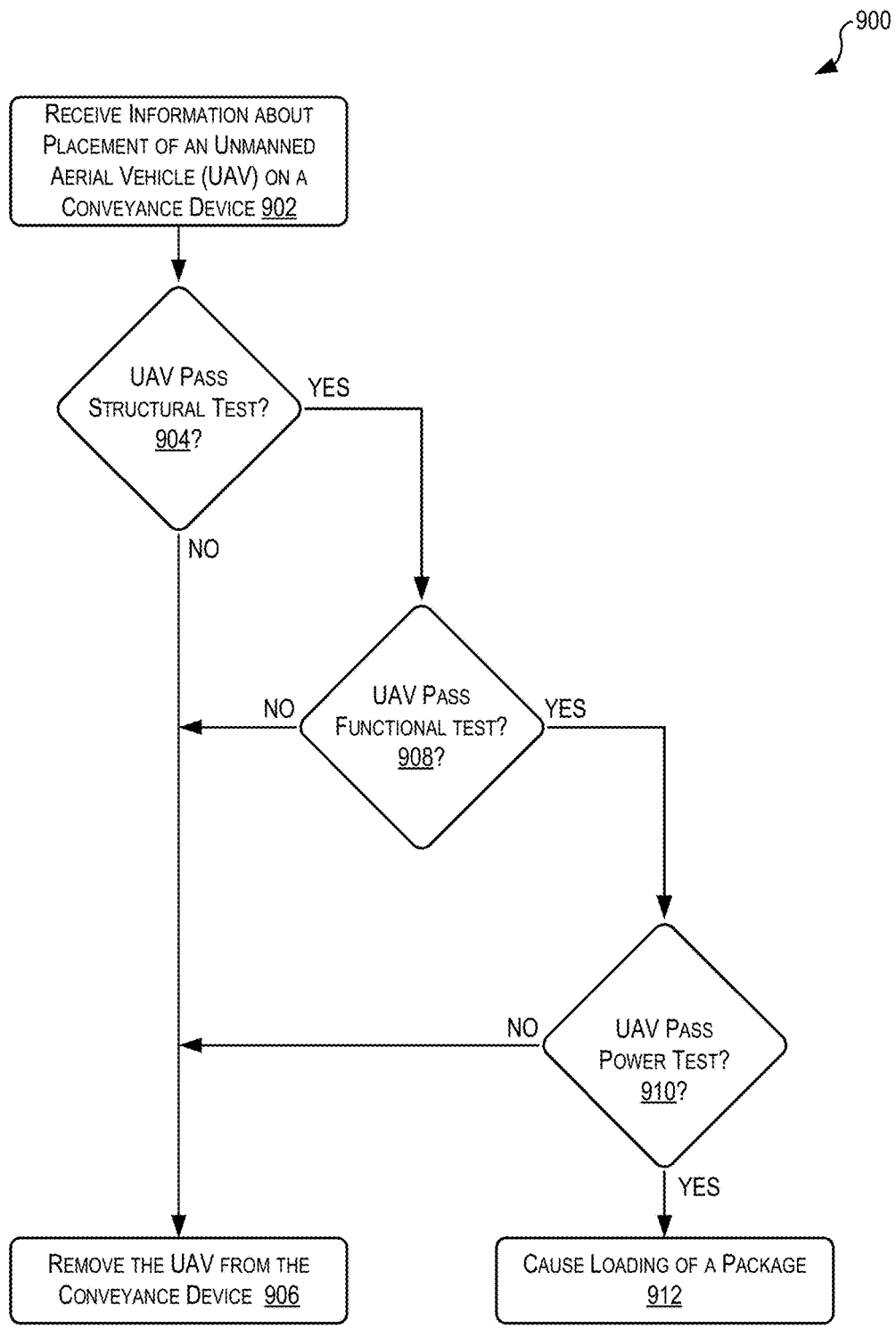
FIG. 9 is a flow diagram depicting example acts for implementing techniques relating to evaluating and loading UAVs, according to at least one example.
Figure 10:
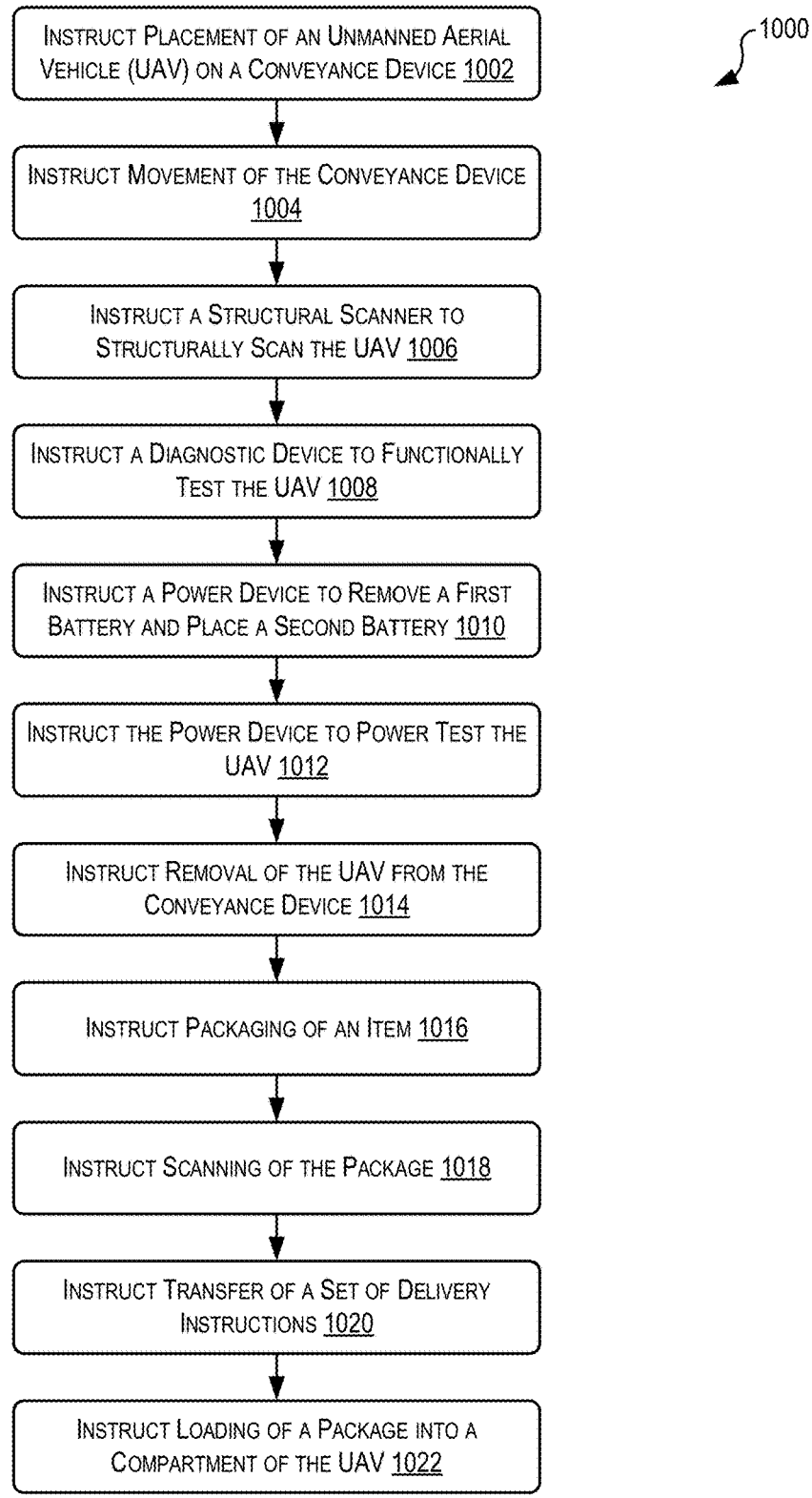
FIG. 10 is a flow diagram depicting example acts for implementing techniques relating to evaluating and loading UAVs, according to at least one example.

FIGS. 8, 9, and 10 illustrate example flow diagrams showing respective processes 800, 900, and 1000 as described herein. These processes 800, 900, and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 8 depicts the process 800 including example acts or techniques relating to evaluating and loading UAVs, according to at least one example. The UAV fulfillment engine 620 (FIG. 6) may perform the process 800 of FIG. 8. The process 800 begins at 802 by receiving information about placement of an unmanned aerial vehicle (UAV) on a moveable device. This may be performed by the UAV loading module 702 (FIG. 7). In some examples, receiving the information about placement may include instructing a robotic arm to place the UAV on the moveable device. In some examples, receiving the information about placement may include instructing the UAV to land on the moveable device. In some examples, receiving the information may include receiving the information from one or more sensors associated with the moveable device and/or receiving the information from a computing device used to track positions of the UAV. For example, a human user may place the UAV on the moveable device and perform a physical action (e.g., push a button, scan a barcode, etc.) that generates the information about the UAV being placed on the moveable device.

The moveable device may include a UAV loading structure configured to support a plurality of UAVs in a vertical configuration. In this example, receiving information about placement of the UAV on the moveable device may include causing placement of the UAV into a slot of a plurality of vertically oriented slots of the UAV loading structure. The plurality of slots may correspond to a plurality of slot levels.

The moveable device may include a conveyance device configured to support a plurality of UAVs in a horizontal configuration. In this example, receiving information about placement of the UAV on the moveable device may include causing placement of the UAV onto a surface of the conveyance device.

At 804, the process 800 causes evaluation of the UAV. Causing evaluation of the UAV may include, at 806, causing a structural scanner to scan at least a portion of the UAV. This may be performed by the structural scanning module 704 (FIG. 7). The structural scanner can include a plurality of laser scanners. Causing evaluation of the UAV may include, at 808, causing a diagnostic device to test functionality of at least one system of the UAV. This may be performed by the diagnostic module 706 (FIG. 7). In some examples, the at least one system of the UAV may include an avionics system, an obstacle detection and avoidance system, a communication system, a propulsion system, a power management system, and/or a package retention system. Causing evaluation of the UAV may include, at 810, causing a power device to perform a power-related operation with respect to the UAV. This may be performed by the power module 708 (FIG. 7). In some examples, the power-related operation may include a battery replacement operation including removal of a first battery from the UAV and placement of a second battery in the UAV and/or a power test operation including testing of a power system of the UAV. When the moveable device includes a UAV loading structure, the structural scanner, the diagnostic device, and the power device may each be disposed on a different level of the plurality of slot levels. The moveable device may be configured to transport the UAV and other UAVs between a plurality of stations. The structural scanner, the diagnostic device, and/or the power device may each be disposed at a respective station of the plurality of stations.

At 812, the process 800 causes loading of a package. This may be performed by the package loading module 712 (FIG. 7). Causing loading of the package may include causing loading of the package while the UAV is located in the UAV loading structure. In some examples, the process 800 further includes, prior to causing loading of the package, causing removal of the UAV from the surface of the conveyance device. In some examples, causing loading of the package into the compartment of the UAV includes causing loading of the package via a package loading conveyance device and a lift platform. The package loading conveyance device may be configured to move the package to a first position below the UAV. The lift platform may be configured to lift the package from the first position to a second position within the compartment of the UAV.

FIG. 9 depicts the process 900 including example acts or techniques relating to evaluating and loading UAVs, according to at least one example. The UAV fulfillment engine 620 (FIG. 6) may perform the process 900 of FIG. 9. The process 900 begins at 902 by receiving information about placement of an unmanned aerial vehicle (UAV) on a conveyance device. This may be performed by the UAV loading module 702 (FIG. 3). Receiving information about placement of the UAV may include aligning the UAV with a set of fiducial marks disposed on a surface of the conveyance device.

At 904, the process determines whether the UAV passes a structural test. This may be performed by the structural scanning module 704 (FIG. 7). In some examples, determining whether the UAV passes the structural integrity test includes scanning the UAV using a structural scanner to generate scanning information, and identifying structural deficiencies of the UAV based at least in part on the scanning information.

If the UAV fails the structural test (e.g., the answer at 904 is NO), the process 900 proceeds to 906 where the process 900 removes the UAV from the conveyance device. This may be performed by the robotic manipulator module 710 (FIG. 7). In some examples, causing removal of the UAV from the conveyance device includes instructing a first robotic manipulator to remove the UAV from the conveyance device.

If the UAV passes the structural test (e.g., the answer at 904 is YES), the process 900 proceeds to 908 where the process 900 determines whether the UAV passes a functional test. This may be performed by the diagnostic module 706 (FIG. 7). In some examples, determining whether the UAV passes the functional test includes conducting a functional test on at least one system of the UAV to generate diagnostic information, and identifying diagnostic faults of the at least one system based at least in part on the diagnostic information.

If the UAV fails the functional test (e.g., the answer at 908 is NO), the process 900 proceeds to 906 where the process 900 removes the UAV from the conveyance device. In some examples, causing removal of the UAV from the conveyance device includes instructing the first or a second robotic manipulator to remove the UAV from the conveyance device.

If the UAV passes the functional test (e.g., the answer at 908 is YES), the process 900 proceeds to 910 where the process 900 determines whether the UAV passes a power test. This may be performed by the power module 708 (FIG. 7). In some examples, determining whether the UAV passes the power test includes conducting a power test of a power system of the UAV to generate power information, and identifying power deficiencies based at least in part on the power information.

If the UAV fails the power test (e.g., the answer at 910 is NO), the process 900 proceeds to 906 where the process 900 removes the UAV from the conveyance device. In some examples, causing removal of the UAV from the conveyance device includes instructing the first, the second, or a third robotic manipulator to remove the UAV from the conveyance device.

If the UAV passes the power test (e.g., the answer at 910 is YES), the process 900 proceeds to 912 where the process 900 causes loading of a package. This may be performed by the package loading module 712 (FIG. 7). In some examples, causing loading includes causing loading of a package into a compartment of the UAV. The process 900 may also include enabling the UAV to take off after the package has been loaded in the compartment.

FIG. 10 depicts the process 1000 including example acts or techniques relating to evaluating and loading UAVs, according to at least one example. The UAV fulfillment engine 620 (FIG. 6) may perform the process 1000 of FIG. 10. The process 1000 begins at 1002 by instructing placement of an unmanned aerial vehicle (UAV) on a conveyance device. This may be performed by the UAV loading module 702 (FIG. 7). In some examples, the placement takes place at a loading location of the conveyance device. Instructing placement can include instructing a robotic arm to place the UAV, instructing a human user the place the UAV, instructing the UAV to land on the conveyance device, and any other suitable method for placing the UAV on the conveyance device.

At 1004, the process 1000 instructs movement of the conveyance device. This may be performed by the conveyance module 714 (FIG. 7). This may include instructing speed, direction, stops, and the like.

At 1006, the process 1000 instructs a structural scanner to structurally scan the UAV. This may be performed by the structural scanning module 704 (FIG. 7). The structural scanner may be disposed at a first station of a plurality of stations disposed with respect to the conveyance device. In some examples, the process 1000 further includes causing removal of the UAV from the conveyance device at the first station in the event first output from the structural scanner indicates a structural deficiency of the UAV.

At 1008, the process 1000 instructs a diagnostic device to functionally test the UAV. This may be performed by the diagnostic module 706 (FIG. 7). The diagnostic device may be disposed at a second station of the plurality of stations. In some examples, the process 1000 further includes causing removal of the UAV from the conveyance device at the second station in the event second output from the diagnostic device indicates failure of at least one system of the UAV.

At 1010, the process 1000 instructs a power device to remove a first battery from the UAV and place a second battery into the UAV. This may be performed by the power module 708 (FIG. 7). The power device may be disposed at a third station of the plurality of stations.

At 1012, the process 1000 instructs the power device to power test the UAV. This may be performed by the power module 708. The power test may be performed while the UAV is located at the third station. In some examples, the process 1000 further includes causing removal of the UAV from the conveyance device at the third station, in the event the third output from the power devices indicates failure of a power system of the UAV.

At 1014, the process 1000 instructs removal of the UAV from the conveyance device. This may be performed by the UAV loading module 702. In some examples, removal of the UAV may take place at an unloading location of the conveyance device. The process 1000 may also include placement of the UAV into a UAV holding structure.

At 1016, the process 1000 instructs packaging of an item. This may be performed by the package loading module 712 (FIG. 7). Packaging the item may include instructing a package loading device to place the item into a package in an automated manner. The package may include any suitable combination of cardboard (e.g., a cardboard box) or other structural material (e.g., a paper mailer), packing materials (e.g., packing peanuts, packing pillows, etc.), tape or other seam sealing material, and the like. Instructing packaging of the item into the package may also include applying a shipping label to the package. The shipping label may be associated with a customer order to which the item belongs. The shipping label may also include any suitable combination of machine-readable elements (e.g., a barcode) and/or human-readable elements (e.g., written address).

In some examples, the process 1000 may also include instructing scanning of the item prior to packaging the item. Scanning the item may be used to identify a customer order to which the item belongs. Scanning the item may include instructing an optical scanner to scan a barcode (e.g., Uniform Product Code (UPC), Stock Keeping Unit (SKU), or any other comparable identifier).

At 1018, the process 1000 instructs scanning of the package. This may be performed by the package loading module 712. Instructing scanning may include instructing an optical scanner to scan the shipping label. The scanning may include scanning the shipping label (e.g., reading one or more of the machine-readable and/or human-readable elements) associated with the package. The scanning may reveal the customer order and other information about the customer order. For example, such other information may include a set of delivery instructions for instructing the UAV to execute delivery of the item to a customer associated with the customer order. The set of delivery instructions may identify a delivery location (e.g., expressed in Latitude and Longitude, in global positioning system (GPS) coordinates, as marker coordinates, or as any other geographic point identifier), a delivery route for navigating to the delivery location and for returning (e.g., tracks that connect waypoints between a beginning location and an end location, headings, and other suitable manners for expressing directions) special delivery instructions (e.g., deliver in backyard, delivery on trampoline, etc.), and any other information relating to delivery of the package. In some examples, the set of delivery instructions may be computed by a routing service (e.g., a third-party service that specializes in route computation). For example, a delivery location may be provided to the routing service and, in response, the routing service may compute the delivery route including navigational instructions to be used by the UAV. In some examples, the set of delivery instructions may be transferred to the UAV without requiring a shipping label scan or a shipping label. In this example, once the system has determined an association between a customer's package and a UAV that will deliver the package, the system may send the delivery instructions to the UAV in the form of digital instructions, e.g., at block 1020.

At 1020, the process 1000 instructs transfer of the set of delivery instructions to the UAV. This may be performed by the package loading module 712. Instructing transfer of the set of delivery instructions may include transferring the instructions in the form of digital instructions. The digital instructions may be transferred in any suitable manner. For example, this may include transferring the digital instructions by instructing a radio-frequency device to transfer the set of instructions via a radio-frequency transmission or by transferring the digital instructions to the UAV via a wired connection, a cellular network, a local area network, a Bluetooth network, Near Field Communication (NFC) technology, or over any other suitable transportation medium using any other suitable technology.

At 1022, the process 1000 instructs loading of a package into a compartment of the UAV. This may be performed by the package loading module 712 (FIG. 7). In some examples, loading of the package may take place while the UAV is held by the UAV loading structure.

In some examples, the process 1000 further includes instructing the structural scanner to structurally scan a second UAV while the second UAV is at the first station and while the UAV is located at one of the second station or the third station.

In some examples, the process 1000 further includes causing removal of the UAV from the conveyance device at each of the first station, the second station, or the third station by instructing a respective robotic manipulator of the first station, the second station, or the third station to remove the UAV from the conveyance device.

Figure 11:
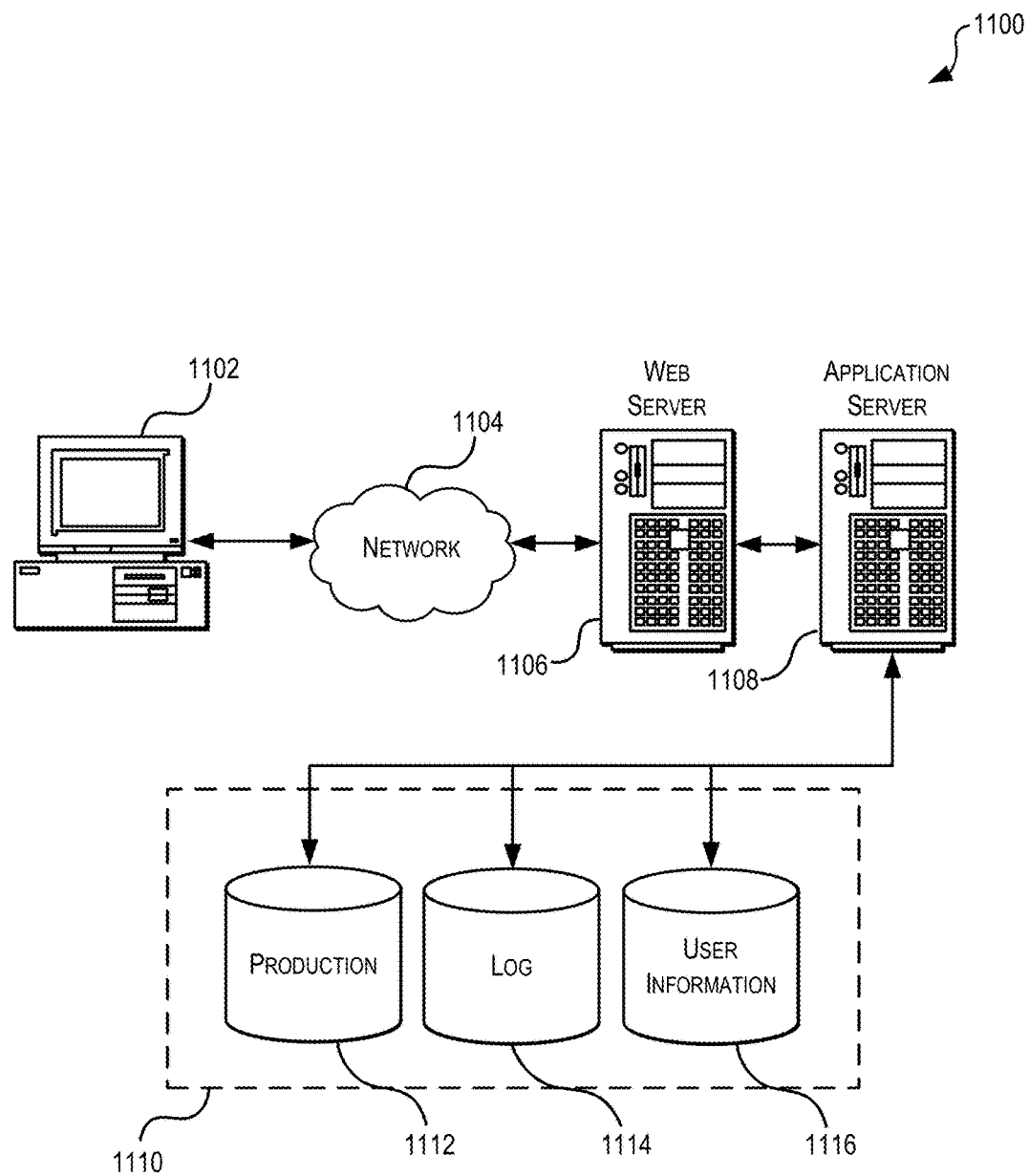
FIG. 11 is an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a conveyance device configured to receive and transport a plurality of vehicles from a loading location of the conveyance device to an unloading location of the conveyance device, the conveyance device, when installed, defining a plurality of stations between the loading location and the unloading location; and
a management device in communication with the conveyance device, a structural scanner disposed at a first station, a diagnostic device disposed at a second station, and a power device disposed at a third station, the management device configured to at least:
instruct placement of a vehicle on the conveyance device at the loading location;
instruct movement of the conveyance device;
instruct the structural scanner disposed at the first station to structurally scan the vehicle while the vehicle is located at the first station;
instruct the diagnostic device disposed at the second station to functionally test the vehicle while the vehicle is located at the second station;
instruct the power device to power test the vehicle while the vehicle is located at the third station; and
instruct removal of the vehicle from the conveyance device at the unloading location.

2. The system of claim 1, wherein:
the vehicle is a first vehicle; and
the management device is further configured to at least instruct the structural scanner to structurally scan a second vehicle while the second vehicle is at the first station and while the first vehicle is located at one of the second station or the third station.

3. The system of claim 1, wherein the management device is further configured to at least:
instruct removal of the vehicle from the conveyance device at the first station in the event first output from the structural scanner indicates a structural deficiency of the vehicle;
instruct removal of the vehicle from the conveyance device at the second station in the event second output from the diagnostic device indicates failure of at least one system of the vehicle; and
instruct removal of the vehicle from the conveyance device at the third station in the event third output from the power device indicates failure of a power system of the vehicle.

4. The system of claim 3, wherein:
the system further comprises robotic manipulators disposed at each of the first station, the second station, and the third station; and
instructing removal of the vehicle from the conveyance device at each of the first station, the second station, and the third station comprises instructing the respective robotic manipulator of the first station, the second station, or the third station to remove the vehicle from the conveyance device.

5. A computer-implemented method, comprising:
while an aerial vehicle moves along a conveyance device, causing at least:
a structural scanner to scan at least a portion of the aerial vehicle;
a diagnostic device to test functionality of at least one system of the aerial vehicle; and
a power device to perform a power-related operation with respect to the aerial vehicle.

6. The computer-implemented method of claim 5, further comprising:
instructing placement of the aerial vehicle on a loading structure configured to support a plurality of aerial vehicles in a vertical configuration; and
causing loading of a package into a compartment of the aerial vehicle.

7. The computer-implemented method of claim 6, wherein:
instructing placement of the aerial vehicle on the loading structure comprises causing placement of the aerial vehicle into a slot of a plurality of vertically oriented slots of the loading structure, the plurality of vertically oriented slots corresponding to a plurality of slot levels; and
causing loading of the package comprises causing loading of the package while the aerial vehicle is located in the slot.

8. The computer-implemented method of claim 7, wherein the structural scanner, the diagnostic device, and the power device are each disposed on a different level of the plurality of slot levels.

9. The computer-implemented method of claim 5, further comprising instructing placement of the aerial vehicle on the conveyance device that is configured to support a plurality of aerial vehicles in a horizontal configuration.

10. The computer-implemented method of claim 9, wherein:
instructing placement of the aerial vehicle on the conveyance device comprises instructing placement of the aerial vehicle onto a surface of the conveyance device; and
the method further comprises instructing removal of the aerial vehicle from the surface of the conveyance device.

11. The computer-implemented method of claim 5, wherein the power-related operation comprises at least one of:
a battery replacement operation comprising removal of a first battery from the aerial vehicle and placement of a second battery in the aerial vehicle; or
a power test operation comprising testing of a power system of the aerial vehicle.

12. The computer-implemented method of claim 5, further comprising:
causing loading of a package into a compartment of the aerial vehicle; and
causing transfer of a set of delivery instructions to the aerial vehicle to deliver the package to a customer.

13. The computer-implemented method of claim 5, wherein the at least one system of the aerial vehicle comprises at least one of an avionics system, an obstacle detection and avoidance system, a communication system, a propulsion system, a power management system, or a package retention system.

14. The computer-implemented method of claim 5, wherein:
the method further comprises instructing placement of the aerial vehicle on the conveyance device that is configured to transport the aerial vehicle and other aerial vehicles between a plurality of stations; and
the structural scanner, the diagnostic device, and the power device are each disposed at a respective station of the plurality of stations.

15. The computer-implemented method of claim 5, further comprising causing loading of a package into a compartment of the aerial vehicle by at least:
causing a package loading device to move the package to a first position below the aerial vehicle; and
causing a lift platform of the package loading device to lift the package from the first position to a second position within the compartment of the aerial vehicle.

16. A computer-implemented method, comprising:
receiving information about placement of an aerial vehicle on a conveyance device;
determining whether the aerial vehicle passes at least one of a structural integrity test or a functionality test; and
instructing removal of the aerial vehicle from the conveyance device in the event the aerial vehicle fails at least one of the structural integrity test or the functionality test.

17. The computer-implemented method of claim 16, wherein:
determining whether the aerial vehicle passes the structural integrity test comprises at least:
scanning the aerial vehicle using a structural scanner to generate scanning information; and
identifying structural deficiencies of the aerial vehicle based at least in part on the scanning information; and
determining whether the aerial vehicle passes the functionality test comprises at least:
operating at least one system of the aerial vehicle to generate diagnostic information; and
identifying diagnostic faults of the at least one system based at least in part on the diagnostic information.

18. The computer-implemented method of claim 16, wherein:
instructing removal of the aerial vehicle from the conveyance device in the event the aerial vehicle fails the structural integrity test comprises instructing a first robotic manipulator to remove the aerial vehicle from the conveyance device; and
instructing removal of the aerial vehicle from the conveyance device in the event the at least one system of the aerial vehicle fails the functionality test comprises instructing a second robotic manipulator to remove the aerial vehicle from the conveyance device.

19. The computer-implemented method of claim 16, wherein causing placement of the aerial vehicle on the conveyance device comprises aligning the aerial vehicle with a set of alignment fiducials disposed on the conveyance device.

20. The computer-implemented method of claim 16, further comprising enabling the aerial vehicle to take off from the conveyance device in the event the aerial vehicle passes the structural integrity test and the functionality test.

* * * * *